United States Patent [19]

Linde

[11] Patent Number: 4,462,074
[45] Date of Patent: Jul. 24, 1984

[54] DO LOOP CIRCUIT

[75] Inventor: Yosef Linde, Needham, Mass.

[73] Assignee: Codex Corporation, Mansfield, Mass.

[21] Appl. No.: 322,955

[22] Filed: Nov. 19, 1981

[51] Int. Cl.³ .............................................. G06F 9/06
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,587,044 | 6/1971 | Jenkins | 340/200 |
| 3,593,313 | 7/1971 | Tomaszewski et al. | 364/200 |
| 4,037,213 | 7/1977 | Atkins et al. | 364/200 |
| 4,097,920 | 6/1978 | Ozga | 364/200 |
| 4,156,905 | 5/1979 | Fassbender | 364/200 |
| 4,160,273 | 7/1979 | Marlowe et al. | 364/900 |
| 4,292,667 | 9/1981 | Catiller et al. | 364/200 |
| 4,321,687 | 3/1982 | Parsons et al. | 364/900 |

Primary Examiner—Jerry Smith
Assistant Examiner—Mark P. Watson

[57] ABSTRACT

In a programmable machine, a combination for executing a do loop without requiring "overhead" steps to be included in the do loop, having means for determining when the final do loop step is being executed, means for counting the number of do loop iterations remaining, and means for proceeding to the first do loop step each time the final do loop step is being executed provided the last iteration has not been reached, or otherwise for exiting from the do loop.

9 Claims, 1 Drawing Figure

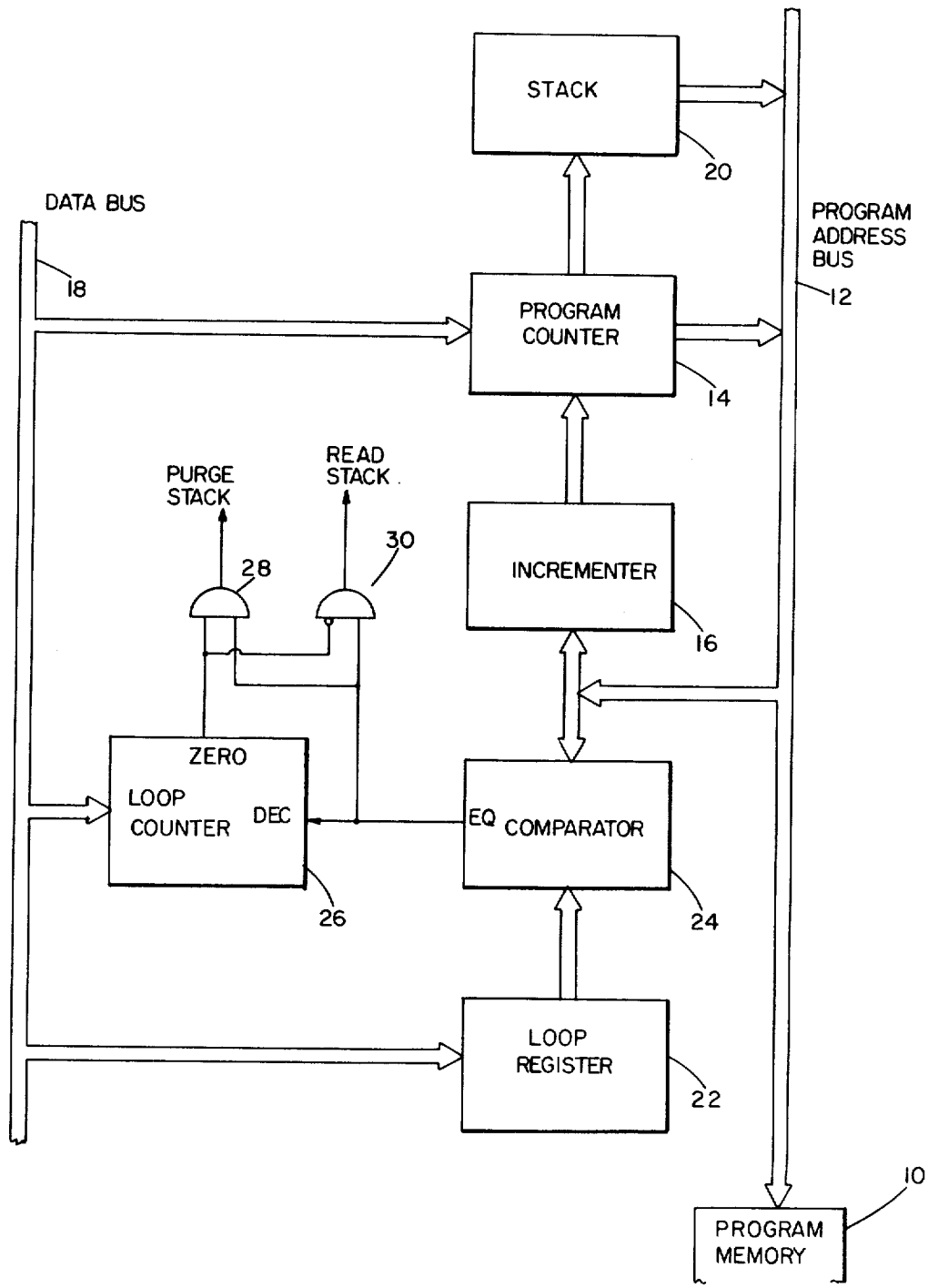

DO LOOP CIRCUIT

BACKGROUND OF THE INVENTION

This invention relates to the execution of do loops in programmable machines.

Do loops, i.e., sequences of program steps which must be repeated, are typically effected in software by providing a set-up step specifying the number of repetitions required ("I") followed by the sequence of loop steps including the two steps of first determining the number of iterations remaining (by updating I to I−1) and then either returning to perform another iteration (if I is greater than 0) or exiting from the loop (if I=0). These two steps must be performed as part of each iteration and, if the number of iterations is large, the processing time devoted to such wasteful "overhead" can be significant. The "overhead" time can be reduced by reserving one flag bit of the instruction for each step to indicate whether or not the step is the final step, and checking that bit before each instruction is executed. This arrangement also causes wasteful "overhead" in the extra instruction bit required.

SUMMARY OF THE INVENTION

In general, the invention features the combination of first means for determining, while each do loop step is being executed, whether it is the final step in the do loop, second means for determining, during each execution of said final step, whether the do loop has been executed the selected number of times, and means for thereafter re-executing the first step in the do loop if the second means indicates that the do loop has not been executed the selected number of times, and for otherwise causing the apparatus to exit from the do loop. In preferred embodiments, the first means comprises means for storing the address of the final step and means for comparing the stored address with the address of the step being executed; the apparatus includes a program address bus carrying the address in the program memory means of the next step to be executed, wherein the means for storing is a register and the means for comparing is a comparator having its inputs connected to the register and to the program address bus; the second means comprises counting means responsive to each execution of the do loop to decrement the count to zero from a number one less than the selected number of times; the counting means is a down counter having its count triggering input connected to the first means; the executing means includes means for storing the address of the first step of the do loop, means for retrieving the stored address after each execution of the final step until the do loop has been executed the selected number of times, and means for purging the stored address from the means for storing when the do loop has been executed the selected number of times; the means for storing is a last-in, first-out memory stack, the means for retrieving is a first gate having its output connected to a read triggering input of the stack, and the means for purging is a second gate having its output connected to a purge triggering input of said stack; the apparatus includes program address carrying means for indicating the address in the program memory means of the next step to be performed, address indicating means connected to the program address carrying means for providing the address of the next step to be executed, and means for incrementing by one the address on the program address carrying means and providing the incremented address to the address indicating means; and the program address carrying means is a data bus connected to the means for thereafter executing, the address indicating means, the incrementing means and the first means for determining, and the address indicating means and the means for incrementing are counters.

The invention permits the execution of a do loop without requiring the inclusion in the do loop of steps for determining when the required number of iterations has been completed, thereby reducing the amount of processor time required for do loop execution.

Other advantages and features of the invention will be apparent from the following description of the preferred embodiments thereof, and from the claims.

DESCRIPTION OF THE PREFERRED EMBODIMENT

We turn now to the structure and operation of the preferred embodiment, first briefly describing the drawing thereof.

DRAWING

The FIGURE is a block diagram of the elements of the preferred embodiment.

STRUCTURE

In the FIGURE program memory 10 contains the steps of a program which includes a do loop to be executed a predetermined number of times (I). Program address bus 12 provides to program memory 10 the address of the next step to be executed. Program counter 14, connected to address bus 12, holds the address of the next step to be executed. The address held in program counter 14 is received either from incrementer 16 or from data bus 18. Incrementer 16 adds one to the address that appears on address bus 12 and provides the incremented address to program counter 14. Stack 20 is a last in-first out memory which responds to a "read" command by reading out the most recently stored address onto address bus 12. Stack 20 responds to a "purge" command by discarding the most recently stored address. Addresses are provided to stack 20 from program counter 14.

Loop register 22 receives from data bus 18 and holds the address of the final step of the do loop. Comparator 24 provides a signal on output EQ to loop counter 26 when the address in loop register 22 equals the address on address bus 12. Loop counter 26 holds the number of loop iterations which remain to be performed. The number one less than number of iterations (I−1) is initially provided through data bus 18 to loop counter 26. The number in loop counter 26 is decreased by 1 each time comparator 24 provides an "equal" signal on input DEC (indicating that the final do loop step is being executed). Loop counter 26 provides a signal on output ZERO to purge stack gate 28 and read stack gate 30 when the number in loop counter 26 is zero.

Read stack gate 30 provides a "read" signal to stack 20 when loop counter 26 is not providing a "zero" signal and comparator 24 is providing an "equal" signal. In response to a "read" signal from read stack gate 30, stack 20 provides the last recorded address to address bus 12. Purge stack gate 28 provides a "purge" signal to stack 20 when loop counter 26 is providing a "zero" signal and comparator 24 is providing an "equal" signal. In response to a "purge" signal from purge stack gate 28, stack 20 discards the most recently recorded address.

OPERATION

To execute a do loop, the address of the final step in the do loop is loaded through data bus 18 onto loop register 22; the number (I−1) is loaded through data bus 18 onto loop counter 26 and at the same time program counter 14 is triggered to load onto stack 18 the address of the next step to be executed (which is the first step of the do loop).

The first step of the do loop, contained in program memory 10 at the address held in program counter 14, is executed. Program counter 14 is incremented by 1 by incrementer 16, and the next step of the do loop is executed. During the execution of each step in the do loop, comparator 24 compares the address on address bus 12 with the address held in loop register 22 and when those addresses are equal (indicating that the final step in the do loop has been reached) comparator 24 causes 1 to be subtracted from the number in loop counter 26, thereby updating loop counter 26 to contain the remaining number of iterations of the do loop. Before loop counter 26 is updated, if the number in loop counter 26 is not zero (indicating that the do loop has not yet been executed I times) read stack gate 30 receives enabling signals on both of its input lines and sends a "read" signal which causes the last address loaded into stack 20 (i.e., the first address in the do loop), to be provided on address bus 12 to program memory 10, thus beginning another iteration of the do loop. The steps of the do loop are executed repeatedly until the time when, just before loop counter 26 is updated the number in loop counter 26 is zero, indicating that the do loop has been executed I times. A signal is then provided on the output line of loop counter 26 and purge stack gate 28, having signals on both of its input lines sends a "purge" signal which causes stack 20 to discard its most recently stored address. Program counter 14 receives from incrementer 16 and provides to address bus 12 the address of the first step after the do loop and the program execution proceeds normally.

Program memory 10, address bus 12, program counter 14, incrementer 16, data bus 18, stack 20, loop register 22, comparator 24, loop counter 26, purge stack gate 28 and read stack gate 30 are readily available hardware components which can be easily assembled by one skilled in the art.

Other embodiments are within the following claims. E.g., the apparatus of the invention can be nested to handle do loops within do loops.

What is claimed is:

1. In data processing apparatus for executing the steps of a program, said apparatus having a program memory means, a combination for executing a selected number of times the steps of a do loop within said program comprising:
first means for determining, while each do loop step is being executed, whether it is the final step in said do loop without decoding any part of the instruction associated with said do loop step,
second means for determining, during each execution of said final step, whether said do loop has been executed said selected number of times, and
means for thereafter re-executing the first step in said do loop if said second means indicates that said do loop has not been executed said selected number of times, and for otherwise causing said apparatus to exit from said do loop.

2. The apparatus of claim 1 wherein said first means comprises means for storing the address of said final step and means for comparing said stored address with the address of the step being executed.

3. The apparatus of claim 2 further comprising a program address bus carrying the address in said program memory means of the next step to be executed, and wherein said means for storing is a register and said means for comparing is a comparator having its inputs connected to said register and to said program address bus.

4. The apparatus of claim 1 wherein said second means comprises counting means responsive to each execution of the do loop to decrement the count to zero from a number one less than said selected number of times.

5. The apparatus of claim 4 wherein said counting means is a down counter having its count triggering input connected to said first means.

6. The apparatus of claim 1 wherein said re-executing means comprises
means for storing the address of said first step of said do loop,
means for retrieving said stored address after each execution of said final step until said do loop has been executed said selected number of times, and
means for purging said stored address from said means for storing when said do loop has been executed said selected number of times.

7. The apparatus of claim 6 wherein
said means for storing is a last-in, first-out memory stack,
said means for retrieving is a first gate having its output connected to a read triggering input of said stack, and
said means for purging is a second gate having its output connected to a purge triggering input of said stack.

8. The apparatus of claim 1 further comprising
program address carrying means for indicating the address in said program memory means of the next step to be performed,
address indicating means connected to said program address carrying means for providing the address of the next step to be executed, and
means for incrementing by one the address on said program address carrying means and providing the incremented address to said address indicating means.

9. The apparatus of claim 8 wherein
said program address carrying means is an address bus connected to said means for thereafter re-executing, said address indicating means, said incrementing means and said means for incrementing are counters.

* * * * *